United States Patent [19]
Moore et al.

[11] Patent Number: 5,301,251
[45] Date of Patent: Apr. 5, 1994

[54] METHOD AND APPARATUS FOR AFFIXING AN OPTIC FIBER TIP IN POSITION WITH RESPECT TO A FIBER COMMUNICATIONS CIRCUIT

[75] Inventors: Andrew J. Moore; David L. S. Ma; Robert L. Bontz; Harry B. Bonham, Jr., all of Plano, Tex.

[73] Assignee: Alcatel Network Systems, Inc., Richardson, Tex.

[21] Appl. No.: 990,899

[22] Filed: Dec. 15, 1992

[51] Int. Cl.⁵ .............................................. G02B 6/42
[52] U.S. Cl. ......................................... 385/91; 385/88
[58] Field of Search ................................... 385/88–94

[56] References Cited
U.S. PATENT DOCUMENTS

| | | | |
|---|---|---|---|
| 4,030,811 | 6/1977 | Khoe et al. | 385/91 |
| 4,474,429 | 10/1984 | Yoldas et al. | 385/88 X |
| 4,500,165 | 2/1985 | Scholl et al. | 385/91 X |
| 4,729,623 | 3/1988 | Mery | 385/91 |
| 4,741,796 | 5/1988 | Althaus et al. | 385/91 X |
| 5,101,464 | 3/1992 | Mousseaux et al. | 385/88 |
| 5,107,537 | 4/1992 | Schriks et al. | 385/91 |

Primary Examiner—John D. Lee
Attorney, Agent, or Firm—Bruce C. Lutz; Dennis O. Kraft

[57] ABSTRACT

The invention disclosed includes both a method and apparatus for affixing an optic fiber tip in position with respect to a fiber communications circuit. In one embodiment of the method, a glass positioning member is located proximate the tip of the optic fiber. In another step, the glass positioning member is affixed to the fiber at a first position with respect to the fiber tip. The glass positioning member is also affixed in a second position with respect to the carrier. In a more detailed embodiment, the method of the present invention includes positioning the optic fiber through a channel of the glass positioning member. Heat is applied to the glass positioning member causing it to soften such that its channel collapses around and fuses to the fiber. In still further detail, the fused positioning member/fiber are affixed to a block, and the block is fused to a carrier. Alignment steps are taken during the fusing steps to locate the tip of the fiber in the desired position relative to the fiber communications circuitry.

18 Claims, 3 Drawing Sheets

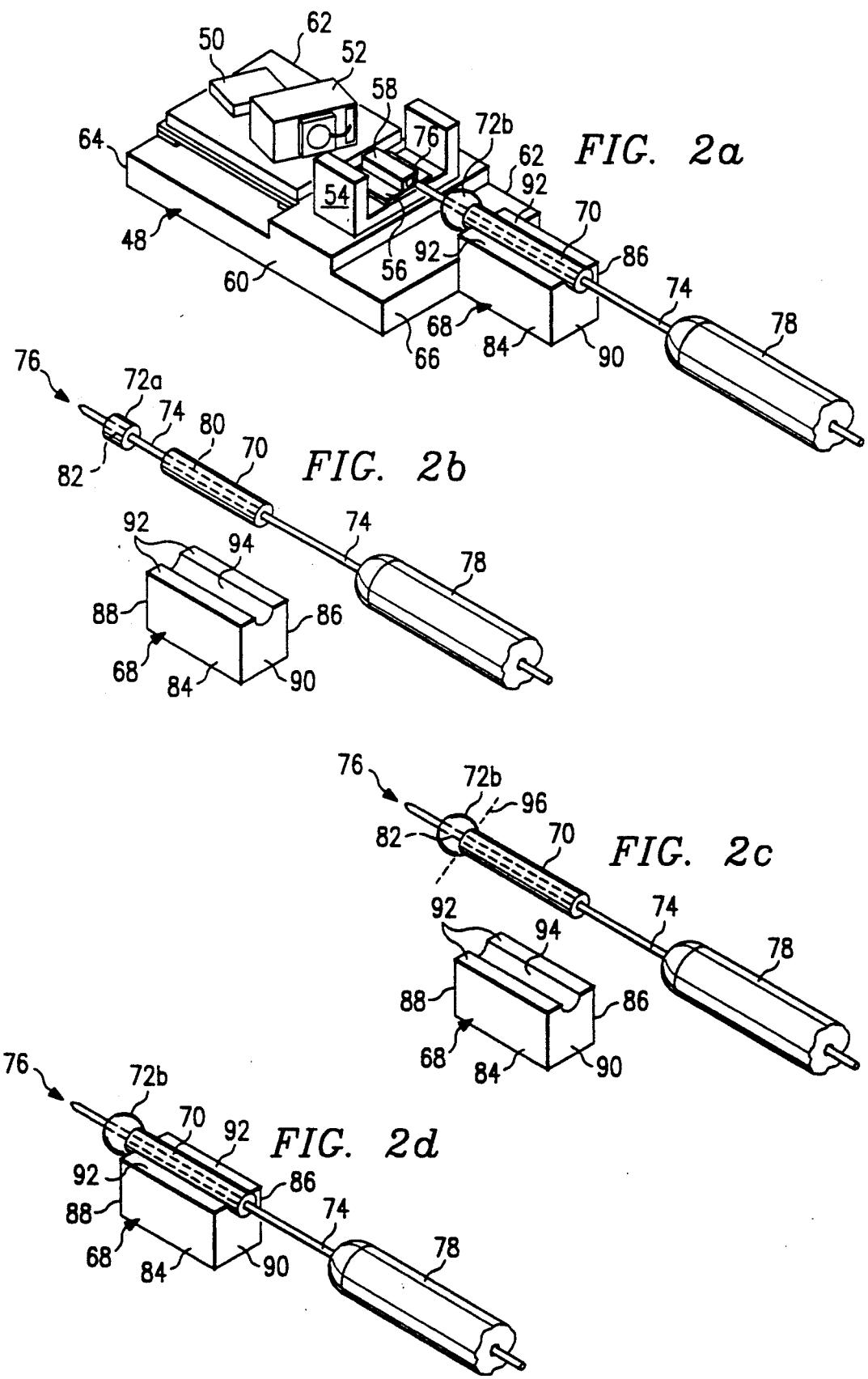

METHOD AND APPARATUS FOR AFFIXING AN OPTIC FIBER TIP IN POSITION WITH RESPECT TO A FIBER COMMUNICATIONS CIRCUIT

This invention relates to the field of fiber optic communications, and is more particularly directed to a method and apparatus for affixing an optic fiber tip in position with respect to a fiber communications circuit.

BACKGROUND OF THE INVENTION

The use of fiber optic technology in the communications industry continues to increase. As is known in the art, fiber optic communications provide numerous advantages such as increased bandwidth, less noise, lower signal-to-noise ratio requirements, and lower error rates. In addition, the use of fiber optic cable relative to metallic conductors permits a much larger traffic of communication to occupy the same space previously required by metallic conductors.

As known in the art, communication of signals through an optic fiber is accomplished by placing communications circuitry at the tips of both ends of the optic fiber. FIG. 1a illustrates a perspective view of certain components of such a system. Specifically, FIG. 1a illustrates a carrier 10 which is commonly disposed within a fiber optics package (shown in FIG. 1b). As known in the art, carrier 10 supports various components including a thermistor 12 and a back-wave detector 14. Carrier 10 further supports a U-shaped subcarrier 16. A submount 18 is disposed on top of subcarrier 16 and supports a laser 20.

Carrier 10 further includes an integral extension 21 which supports an adjustment post 22. A small mass of solder (not shown) supports a fiber retaining slab 24 on top of adjustment post 22. Slab 24 includes a longitudinal groove 26 on the order of 0.01 inches in width. An optic fiber 28 extends from a sleeve 30 and is retained within groove 26. The tip 32 of fiber 28 extends inwardly beyond the edge of slab 24 and immediately proximate laser 20. Thus, laser 20 can communicate signals to and from fiber 28 by either sensing signals or transmitting signals to tip 32 of the fiber.

FIG. 1b illustrates a perspective and cutaway view of carrier 10 when disposed within a prior art fiber optics package 34. Package 34 is typically a parallelepiped in shape having a length on the order of 1.0 inch and a width and height on the order of 0.75 inches. Package 34 is carefully constructed to hermetically house various components, including carrier 10. A ferrule 36 permits access through a hole or "pass through" in one side of package 34. Sleeve 30 passes through ferrule 36, thereby permitting optic fiber 28 to extend into the interior of package 34. Typically, solder 38 or an alternative sealant is used at the interface between sleeve 30 and ferrule 36 so that contaminants may not pass via this interface into the interior of package 34. A thermal electric cooler 39 supports carrier 10 and its associated componentry. In addition, package 34 houses an integrated circuit 40 which connects in various manners to the componentry of carrier 10, and also to a series of package pins 42. A pair of power conductors 43a are connected to respective power pins 43b. Thus, signal interaction to the communications circuitry and power supply to thermal electric cooler 39 may be accomplished external from package 34 by accessing pins 42 and 43b.

In the prior art embodiment of FIGS. 1a–b, optic fiber 28 is commonly affixed within retaining slab 24 by use of solder (for a metalized fiber) or epoxies (typically, for a non-metalized fiber). Specifically, either of these materials are used to form deposits 44 and 46 along slab 24 to retain fiber 28 along groove 26. While performing their respective retention function, each of these materials provides various drawbacks and potential problems in connection with the overall system. For example, as is known in the art, solder tends to move or creep over time due to stress. As another example, solder creates a known ratcheting effect due to fluctuations in temperature. Thus, both the solder used as deposits 44 and 46 as well as the solder between post 22 and slab 24 may tend to change position over the lifespan of the system. Such a change correspondingly moves the otherwise fixed position of tip 32 of optic fiber 28. As is known in the art, tolerances for movement of tip 32 are typically only on the order of 0.1 to 1.5 microns. Naturally, therefore, excessive movement of tip 32 is unacceptable and may reduce or eliminate the ability of the system to communicate along optic fiber 28. Conductive epoxy and like materials also suffer due to their corrosive and/or contaminating effects. In addition, quite often these materials produce gaseous byproducts which may interfere with the sensitive operation of laser 20. Thus, these materials also present a risk to the long term reliability of the system of FIGS. 1a–1b.

It is therefore an object of the present invention to provide a method and apparatus for precisely affixing an optic fiber tip in position with respect to a fiber communications circuit.

It is a further object of the present invention to provide such a method and apparatus for reducing the possibility of subsequent movement of an optic fiber tip with respect to its associated communications circuit.

It is a further object of the present invention to provide such a method and apparatus for reducing the amount of contaminants implemented when affixing the tip of an optic fiber proximate its associated communications circuit.

It is a further object of the present invention to provide such a method and apparatus for providing improved axial and radial adjustment of the tip of an optic fiber with respect to its associated communications circuit.

Still other objects and advantages of the present invention will become apparent to those of ordinary skill in the art having reference to the following specification together with its drawings.

SUMMARY OF THE INVENTION

In one embodiment, the present invention includes a method of affixing a tip of an optic fiber in position with respect to a fiber communications circuit disposed on a carrier. In one step, a glass positioning member is located proximate the tip of the optic fiber. In another step, the glass positioning member is affixed to the fiber at a first position with respect to the fiber tip. The glass positioning member is also affixed in a second position with respect to the carrier.

In another embodiment, the present invention includes an apparatus for positioning a tip of an optic fiber in position with respect to a fiber communications circuit. The apparatus includes a carrier supporting the communications circuit. A glass positioning member is attached proximate the tip of the fiber and to a block which is independently adjustable with respect to the carrier. Finally, the block is affixed to the carrier.

Still other embodiments and features are described, as set forth in the following brief and detailed descriptions of the present invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 1b illustrates a perspective and cutaway view of a package housing the embodiment shown in Figure 1a;

FIG. 2a illustrates a perspective view of a block supporting an optic fiber in a fixed position with respect to a carrier in accordance with the present invention;

FIG. 2b illustrates an exploded perspective view of certain component parts of the embodiment shown in FIG. 2a;

FIG. 2c illustrates a perspective view of the embodiment of FIG. 2b wherein a glass positioning member fuses an optic fiber in fixed position with respect to a metallic positioning member;

FIG. 2d illustrates a perspective view of the components of FIG. 2c wherein the metallic positioning member and its associated parts are affixed into a block;

DETAILED DESCRIPTION OF THE INVENTION

Figure 1A:
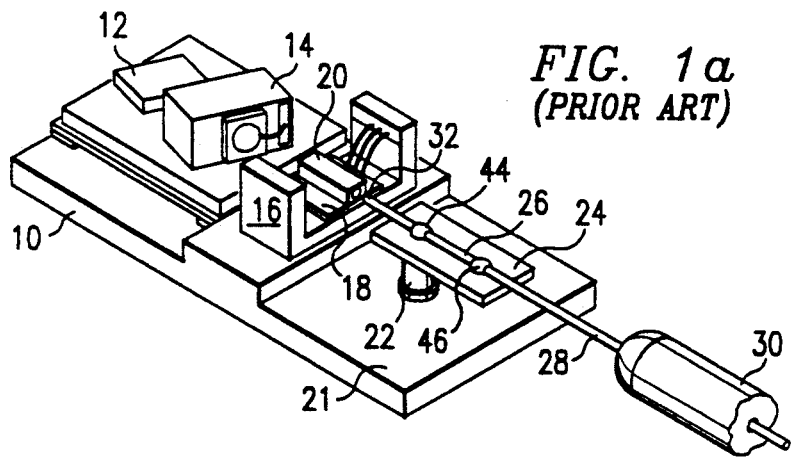
FIG. 1a illustrates a perspective view of a prior art system for supporting the tip of an optic fiber with respect to its associated communications circuit.
Figure 1B:
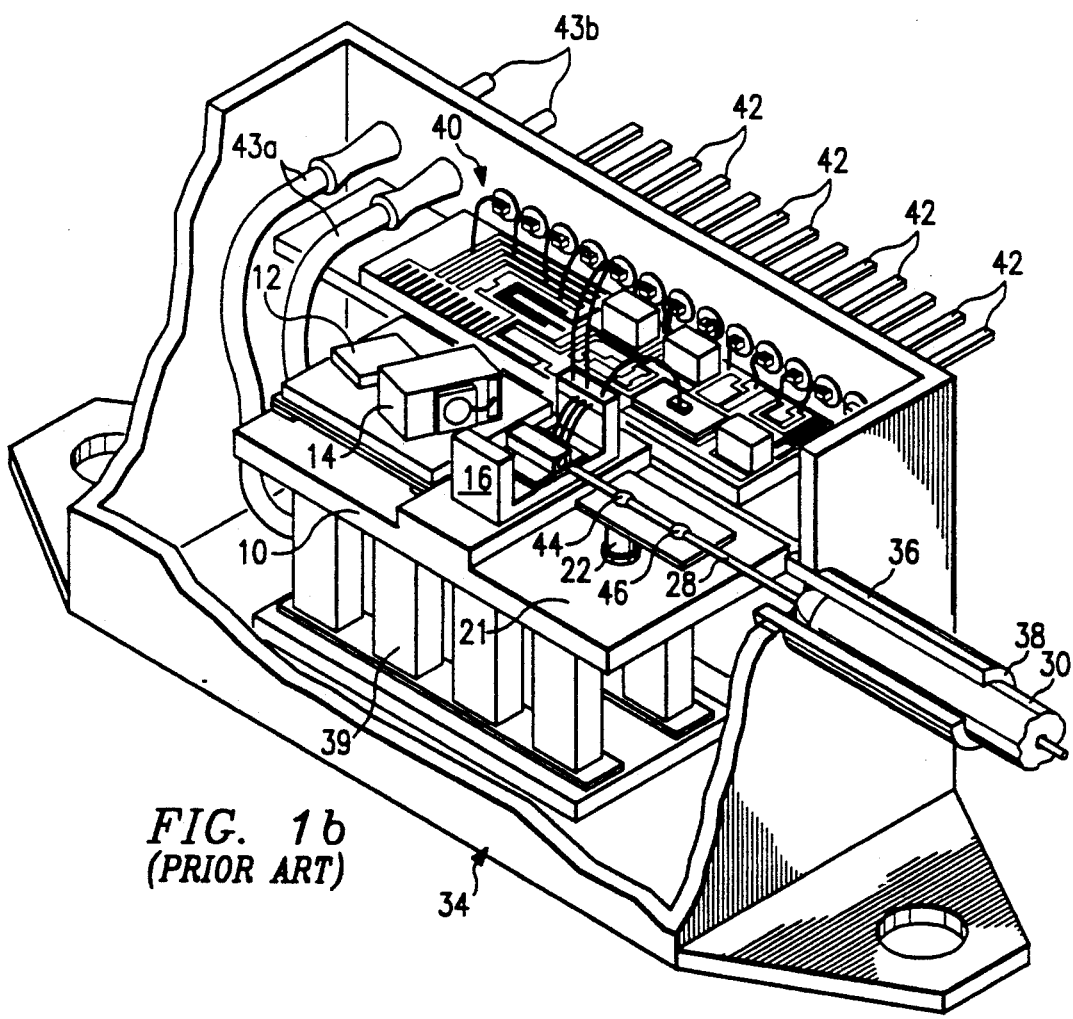

The preferred embodiment of the present invention and its advantages are best understood by referring to FIGS. 1a-3c of the drawings, like numerals being used for like and corresponding parts of the various drawings.

FIG. 2a illustrates a perspective view of one embodiment of the present invention, and FIGS. 2b-d illustrate the assembly of various components of the structure of FIG. 2a. In FIG. 2a, a carrier 48 is 10 shown which is similar to carrier 10 shown in FIGS. 1a-b, above. In general, carrier 48 supports the same communications circuitry as carrier 10 and, hence, includes a thermistor 50, a back wave detector 52, a subcarrier 54, a submount 56 and a laser 58.

Carrier 48 is generally parallelepiped in shape having sides 60 and 62, and ends 64 and 66. In the embodiment shown, carrier 48 is on the order of 0.4 inches in length, and 0.25 inches in width, and 0.1 inches in thickness. Carrier 48 is preferably constructed of a KOVAR, an iron alloy material. Note that unlike carrier 10 of the prior art, carrier 48 does not include an integral extension 21 to support a post 22 and a retaining slab 24. In contrast, in one embodiment described in greater detail below, a separate and independent block 68 is placed adjacent end 66 of carrier 48. Block 68 supports two positioning members 70 and 72b. Positioning member 72b is designated with the reference letter "b" for purposes more readily apparent below. Further, both positioning members 70 and 72b affix an optic fiber 74, and its tip 76, in place with respect to laser 58. As in the prior art, optic fiber 74 extends from a sleeve 78.

FIG. 2b illustrates an exploded perspective view of various components implemented in FIG. 2a. Specifically, FIG. 2b illustrates optic fiber sleeve 78 with optic fiber 74 disposed axially through sleeve 78 and protruding from one end of the sleeve. In the preferred embodiment, the interface from which optic fiber 74 exits sleeve 78 is hermetically sealed. Also, in the preferred embodiment, optic fiber 74 is a nonmetallized optic fiber.

Optic fiber 74 is initially moveably retained by a first positioning member 70. In the preferred embodiment, positioning member 70 is cylindrical in shape and is constructed of metal such as INVAR. Positioning member 70 is on the order of 0.15 inches in length and 0.045 inches in diameter. In addition, positioning member 70 includes an axial channel 80 (shown in phantom) on the order of 0.007 inches in diameter, through which optic fiber 74 is disposed.

FIG. 2b further includes a second positioning member 72a. As described in greater detail below, positioning member 72a is transformed by subsequent process steps to become positioning member 72b as shown in FIG. 2a, above. In the preferred embodiment, 20, positioning member 72a is cylindrical in shape and is constructed of a low melting temperature glass. For purposes of this document, a low melting temperature glass is defined as glass which reaches a transition or melting phase at a temperature on the order of 350° to 450° C. It should be understood, however, that common glass which reaches this transition or melting phase at temperatures on the order of 800° to 1200° C. may be used as an alternative to low temperature glass. Positioning member 72a is preferably 0.04 inches in length and 0.04 inches in diameter. Positioning member 72a also includes an axial channel 82 (shown in phantom) on the order of 0.007 inches in diameter. As is the case for positioning member 70, optic fiber 74 is also disposed through axial channel 82 of positioning member 72a. Thus, tip 76 of optic fiber 74 extends beyond the end of positioning member 72a for purposes more readily apparent below.

In addition to the above, FIG. 2b also illustrates block 68 which, as shown in FIG. 2a, positions optic fiber 74 relative to carrier 48. In the preferred embodiment, block 68 is constructed of INVAR and is generally parallelepiped in shape. Thus, block 68 includes two sides 84 and 86, as well as two ends 88 and 90, and is on the order of 0.15 inches in height. Sides 84 and 86 of block 68 are on the order of 0.15 inches while ends 88 and 90 are on the order of 0.075 inches. Block 68 also includes a top surface 92. A channel 94 is formed longitudinally along top surface 92. In the preferred embodiment, channel 94 is semicircular in cross-section in order to accommodate the physical configuration of positioning member 70 as illustrated in greater detail below. It should be understood, however, that alternative cross-sections, such as a square or V-shaped configuration, could be used as well.

FIG. 2c illustrates the components of FIG. 2b following an additional process step. In FIG. 2c, positioning member 70 has been moved in contact with what is labeled positioning member 72a in FIG. 2b, thereby defining an interface 96 between the two components.

Once in contact, heat is applied to positioning member 72a to bring it to a transition or melting temperature. In this phase, positioning member 72a fuses to the contacting end of positioning member 70. This melting or fusing process causes positioning member 72a to change its general shape and, due to surface tension forces, generally causes it to form a hemispherical or bulbous shape is shown in FIG. 2c. Therefore, for purposes of illustration, the newly shaped positioning member is designated 72b, as contrasted to its 72a designation prior to the melting step.

The softening of positioning member 72a also causes its channel 82 to collapse around optic fiber 74, thereby establishing a retaining force holding optic fiber 74 in fixed position relative to positioning member 70. Thus, this melting process causes both positioning members 70 and 72a to be permanently attached in a fixed position with respect to optic fiber 74. Moreover, in the preferred embodiment, a length of optic fiber 74 on the order of 0.02 inches is permitted to extend beyond positioning member 72b toward tip 76. Having explained the retention force between member 70, member 72b and fiber 74, it should be noted that the preferable materials for members 70 and 72b facilitate such an interaction. Particularly, the INVAR material of member 70 provides an enhanced bond with the quartz material of fiber 74, and with the glass material of member 72b. Moreover, at the appropriate rate of heating, each of these materials has similar coefficients of thermal expansion. Consequently, the materials expand and contract at similar rates, thereby improving the bond between them, and reducing the possibility of a failure in the bond as the components cool or experience temperature fluctuations (e.g., in operations or testing).

FIG. 2d illustrates a perspective view of the componentry of FIG. 2c following an additional processing step. After fusing positioning member 72b to positioning member 70, the combined assembly is placed within channel 94 of block 68. As appreciated from FIG. 2d, the matching profile of channel 94 with the shape of positioning member 70 prevents any substantial radial movement of optic fiber 74. Once positioning member 70 is disposed as shown, it is moved axially so that tip 76 is positioned to a precise distance from end 88 of block 68. This distance is typically determined in relation to carrier 48. In other words, and as shown in FIG. 2a, the axial positioning of fiber 74 with respect to block 68 requires a determination of the positioning of block 68 with respect to carrier 48. As shown in FIG. 2a, block 68 provides a fixed axial reference with respect to carrier 48. Thus, the positioning of fiber 74 in block 68 is performed given a determination of the reference distance imposed by the abutment of block 68 to carrier 48.

Once positioning member 70 is properly located, it is affixed in place with respect to block 68. In the preferred embodiment, affixation is accomplished by applying a laser heat source to top surface 92 on both sides of positioning member 70. This laser heat source causes the metal material of positioning member 70 to weld to the INVAR material of block 68. Note that these materials (i.e., metal and INVAR) are preferable because their respective coefficients of thermal expansion are similar and, hence, both materials expand and contract at similar rates. As a consequence, an improved bond forms between the two materials with minimal risk of separation of the materials over a great temperature range of testing and/or operation.

Returning to FIG. 2a, an additional operational step of the present invention may now be appreciated. Specifically, the initial independence of block 68 from carrier 48 provides an additional element by which adjustment of the position of tip 76 may be accomplished. In particular, end 88 (see FIG. 2d) of block 68 is contoured in shape to align with end 66 of carrier 48. Thus, end 88 of block 68 operates as a positioning surface with respect to carrier 48. In the preferred embodiment, both of these surfaces are flat surfaces. Thus, the two components may be moved adjacent one another in a planar fashion until tip 76 of optic fiber 74 is in a desirable place. This independent moveability of these two subcomponents permits further lateral or radial adjustment of optic fiber 74 with respect to laser 58. This movement is highly advantageous because, again, it is desirable, if not mandatory, to accurately place tip 76 of optic fiber 74 proximate laser 58 within a tolerance of only ±1.5 microns. Once block 68 is positioned in its desirable location with respect to carrier 48, laser heat is precisely applied at the interface between the two components in order to weld them together. It should be noted that the INVAR materials of the block is similar to the KOVAR material of the carrier, that is, both include iron, nickel and chrome. Consequently, the two materials weld together in a favorable fashion, thereby providing a strong weld joint between block 68 and carrier 48.

Figure 3A:
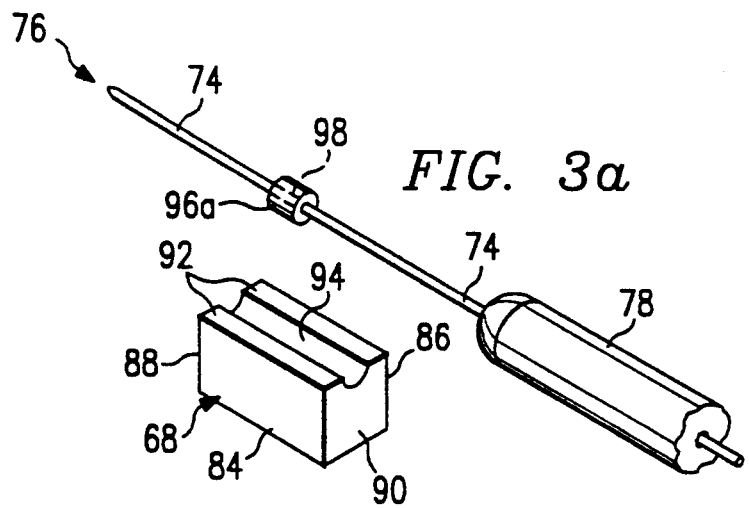
FIG. 3a illustrates an exploded perspective view of a glass positioning member and an optic fiber in an alternative embodiment of the present invention.
Figure 3B:
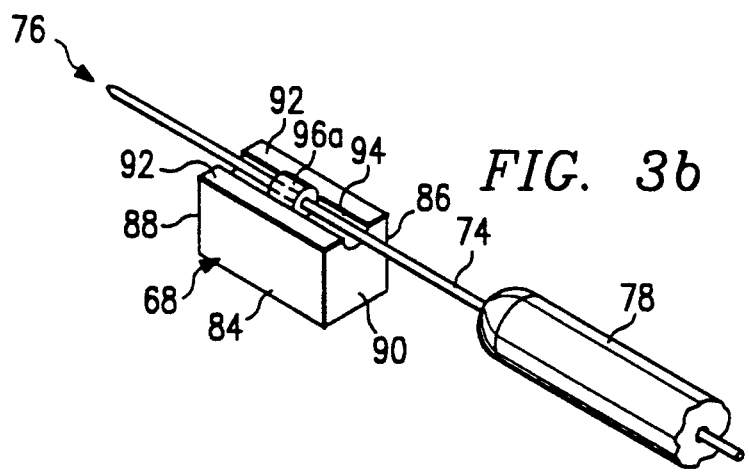
FIG. 3b illustrates a perspective view of the components of FIG. 3a wherein the glass positioning member is disposed within a block.
Figure 3C:
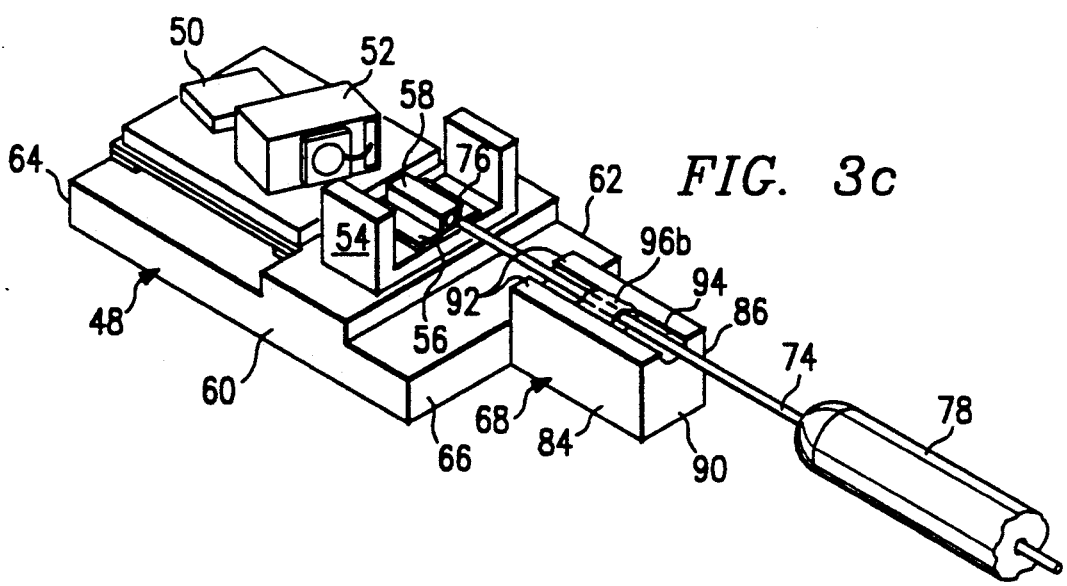
FIG. 3c illustrates a perspective view of the componentry of FIG. 3b wherein the glass positioning member is fused to the block, and the block is disposed adjacent the communications circuit carrier.

From the above, it should be appreciated that FIGS. 2a–d illustrate one embodiment of the present invention which provides numerous benefits and advantages over the prior art. FIGS. 3a–3c illustrate an alternative embodiment which provides additional advantages and seeks to satisfy the objects set forth above.

FIG. 3a illustrates a perspective view of an alternative preferred embodiment of the present invention. Specifically, FIG. 3a again illustrates an optic fiber sleeve 78 with a fiber 74 protruding from a hermetically sealed end of the sleeve. In contrast to FIGS. 2a–d, however, optic fiber 74 is coupled to a single positioning member 96a. In this embodiment, single positioning member 96a is constructed in the same manner as positioning member 72a of FIG. 2b. Thus, positioning member 96a is cylindrical in shape having a length on the order of 0.04 inches and a diameter on the order of 0.04 inches. Positioning member 96a is preferably constructed of low temperature glass and includes an axial channel 98 (shown in phantom) having a diameter on the order of 0.007 inches. Positioning member 96a is threaded onto optic fiber 74 and is placed in a position such that a length of optic fiber 74 on the order of 0.02 inches extends beyond the positioning member to tip 76. FIG. 3a also includes a block 68. Block 68 of the embodiment of FIG. 3a is preferably the same in dimensions and construction type as block 68 described above in connection with FIGS. 2a–2d. Thus, again block 68 includes two sides 84 and 86, two ends 88 and 90, a top surface 92 and a semicircular-shaped channel 94.

FIG. 3b illustrates an additional step of the inventive process following FIG. 3a. In FIG. 3b, positioning member 96a is disposed within channel 94 of block 68. At this point, optic fiber 74 is freely moveable in an axial direction with respect to positioning member 86. Moreover, positioning member 98a may be disposed anywhere along channel 94. Before proceeding with additional steps, optic fiber is moved axially in order to locate tip 76 of the fiber to a precise distance beyond end 90 of block 68. Again, this step of axial positioning implicates the reference distance imposed when block 68 is placed in abutment with carrier 48 as shown in FIG. 2a. Once positioning member 96a and optic fiber 74 are in desirable positions, they are permanently axially affixed in position with respect to block 68 by applying a laser heat source to surfaces 92 in the area of positioning member 96a. Because positioning member 86 is preferably constructed of low temperature glass, the heat causes the glass to reach a transition or melting phase. In this phase, positioning member 96a begins to melt and, thus, gravitational force causes its shape to sag within channel 94. Moreover, this melting step causes channel 98 to collapse around fiber 74. Thereafter, the heat source is removed. As the glass material positioning member 96a cools, it fuses to both optic fiber 74 and block 68. Thus, the cooling process affixes optic fiber 74 in a permanent position with respect to block 68.

FIG. 3c illustrates a perspective view of the embodiment of FIG. 3b following an additional process step. The transition from FIG. 3b to FIG. 3c is substantially the same as the transition from FIG. 2d to FIG. 2a. Thus, once optic fiber 74 is fixed axially with respect to block 68, block 68 is situated in its preferable position with respect to carrier 48. Again, this latter step permits an independent radial positioning of tip 76 with respect to the communications circuit supported by carrier 48. Once block 68 is in its desired position, localized laser heat is applied to weld it to carrier 48. From the perspective of FIG. 3c, it should be appreciated that the melting of positioning member 96a discussed in connection with FIG. 3b causes it to substantially recess within channel 94 of block 68 and, hence, in FIG. 3c, it is labeled as positioning member 96b. Thus, the portion of positioning member 96b extending above surface 92 of block 68 is substantially reduced in comparison to FIG. 3b.

From the exemplary embodiments illustrated above, it may be appreciated that the present invention provides an improved method and apparatus for affixing an optic fiber tip in position with respect to a fiber communications circuit. Moreover, it should be noted that either the embodiment of FIG. 2a or FIG. 3c is preferably disposed within a fiber optic package as is the prior art embodiment illustrated in FIG. 1b, above. Such an application is clearly contemplated by the present invention.

In addition, while the present invention has been described in detail in connection with various embodiments, it should be understood that various alterations, modifications and/or substitutions could be made to the invention by one skilled in the art. For example, in an alternative embodiment, positioning member 96a could be constructed of a material other than glass, such as U-V epoxy. This choice could be used to avoid using heat to affix the fiber to the block. As another example, the positioning members discussed herein could be modified to include a groove rather than an enclosed channel, where the fiber was placed within the groove for affixing it to its respective block. These examples, as well as others known or apparent to one skilled in the art, are intended as included within the present invention as it is defined by the following claims.

What is claimed is:

1. A method of affixing a tip of a optic fiber in position with respect to a fiber communications circuit disposed on a carrier, comprising the steps of:
   locating a glass positioning member having a supportive shape proximate said tip of said optic fiber; and
   affixing said glass positioning member to said fiber at a first position with respect to said tip and in a second position with respect to said carrier.

2. The method of claim 1 wherein said step of affixing said glass positioning member comprises the step of applying heat to said glass positioning member such that said glass positioning member fuses to said optic fiber.

3. The method of claim 2 wherein said step of locating a glass positioning member comprises the step of positioning said optic fiber through a channel of said glass positioning member, and wherein said step of applying heat to said glass positioning member causes said glass positioning member to soften such that said channel collapses around and fuses to said fiber.

4. The method of claim 1 wherein said step of affixing said glass positioning member in a second position comprises the step of affixing said glass positioning member to a block to be placed in abutment with said carrier.

5. The method of claim 1 wherein said step of affixing said glass positioning member comprises the steps of:
   locating a second positioning member proximate said glass positioning member;
   fusing said glass positioning member to said second positioning member and to said fiber;
   fusing said second positioning member to a block; and
   fusing said block to said carrier.

6. A method of affixing a tip of an optic fiber in position with respect to a fiber communications circuit disposed on a carrier, comprising the steps of:
   locating a glass positioning member having a supportive shape proximate said tip of said optic fiber;
   fusing said glass positioning member to said fiber and to a block; and
   fusing said block to said carrier.

7. The method of claim 6 wherein said locating step comprises the step of placing said tip through a channel formed through said glass positioning member, and further comprising the step of axially adjusting said fiber along said channel such that said tip extends a predetermined distance beyond said glass positioning member before said first-stated step of fusing.

8. The method of claim 6 wherein said block has a first surface and said carrier has a second surface, wherein said first surface is contoured in shape to coincide with said second surface, and further comprising the steps of:
   placing said first surface in contact with said second surface; and
   laterally adjusting said block with respect to said carrier before said second-stated step of fusing.

9. A method of affixing a tip of an optic fiber in position with respect to a fiber communications circuit disposed on a carrier having a first planar positioning surface, comprising the steps of:
   locating a positioning member proximate said tip of said optic fiber;
   affixing said positioning member and said tip with respect to a block having a second planar positioning surface substantially perpendicular to said optic fiber;
   adjusting said second planar positioning surface in abutting contact with said first planar positioning surface of said carrier; and
   affixing said block to said carrier.

10. The method of claim 9 wherein said step of affixing said positioning member comprises the steps of:

locating said positioning member in a channel formed in said block such that lateral movement of said positioning member is substantially limited; and applying heat to said positioning member such that said positioning member fuses to said optic fiber and to said channel.

11. The method of claim 9 wherein said step of locating a positioning member comprises the steps of:

positioning said optic fiber through an axial channel of a first cylinder; and positioning said optic fiber through an axial channel of a second cylinder, and wherein said step of affixing said positioning member comprises the step of applying heat to said first and second cylinders such that said first cylinder fuses to said optic fiber and said second cylinder, and such that said second cylinder fuses to said block.

12. A method of affixing a tip of an optic fiber in position with respect to a communications circuit, comprising the steps of:

locating a positioning member having a supportive shape proximate said tip of said optic fiber, wherein said positioning member comprises no epoxy and no organic polymer materials; and affixing said positioning member in position with respect to said communications circuit.

13. A method of affixing a tip of an optic fiber in position with respect to a fiber communications circuit disposed on a carrier, comprising the steps of:

locating a glass positioning member proximate said tip of said optic fiber by placing said tip through a channel formed through said glass positioning member;

fusing said glass positioning member to said fiber and to a block;

fusing said block to said carrier; and axially adjusting said fiber along said channel such that said tip extends a predetermined distance beyond said glass positioning member before said first-stated step of fusing.

14. A method of affixing a tip of an optic fiber in position with respect to a fiber communications circuit disposed on a carrier, comprising the steps of:

locating a glass positioning member proximate said tip of said optic fiber;

fusing said glass positioning member to said fiber and to a block;

fusing said block to said carrier, and wherein said block has a first surface and said carrier has a second surface, wherein said first surface is contoured in shape to coincide with said second surface;

placing said first surface in contact with said second surface; and laterally adjusting said block with respect to said carrier before said second-stated step of fusing.

15. An apparatus for positioning a tip of an optic fiber in position with respect to a fiber communications circuit, comprising:

a carrier supporting said communications circuit;

a block affixed to said carrier;

a first positioning member attached to said block and retaining said fiber at a point proximate said tip; and a glass positioning member attached to said fiber and to said first positioning member.

16. The apparatus of claim 15 wherein said fiber comprises quartz, wherein said first positioning member comprises INVAR and wherein said block comprises INVAR.

17. A method of affixing a tip of an optic fiber in position with respect to a fiber communications circuit disposed on a carrier, comprising the steps of:

locating a glass positioning member proximate said tip of said optic fiber, wherein said step of locating comprises the step of positioning said optic fiber through a channel of said glass positioning member; and affixing said glass positioning member to said fiber at a first position with respect to said tip and in a second position with respect to said carrier, wherein said step of affixing comprises the step of applying heat to said glass positioning member such that said glass positioning member fuses to said optic fiber, and wherein said step of applying heat to said glass positioning member causes said glass positioning member to soften such that said channel collapses around and fuses to said fiber.

18. A method of affixing a tip of an optic fiber in position with respect to a fiber communications circuit disposed on a carrier, comprising the steps of:

locating a glass positioning member proximate said tip of said optic fiber; and affixing said glass positioning member to said fiber at a first position with respect to said tip and in a second position with respect to said carrier, wherein said step of affixing said glass positioning member comprises the steps of:

locating a second positioning member proximate said glass positioning member;

fusing said glass positioning member to said second positioning member and to said fiber;

fusing said second positioning member to a block; and fusing said block to said carrier.

* * * * *